Aug. 28, 1956 J. F. FISHER ET AL 2,761,007

PLURAL PHASE SUBCARRIER COLOR TELEVISION SYSTEM

Filed July 21, 1954 2 Sheets-Sheet 1

INVENTORS
JOSEPH F. FISHER
ROBERT C. MOORE
BY
Alan V. Hazeltine
ATTORNEY

Aug. 28, 1956 J. F. FISHER ET AL 2,761,007

PLURAL PHASE SUBCARRIER COLOR TELEVISION SYSTEM

Filed July 21, 1954 2 Sheets-Sheet 2

INVENTORS
JOSEPH F. FISHER
ROBERT C. MOORE
BY
Dean V. Hagerline
ATTORNEY

United States Patent Office 2,761,007

Patented Aug. 28, 1956

2,761,007

PLURAL PHASE SUBCARRIER COLOR TELEVISION SYSTEM

Joseph F. Fisher, Wynnewood, and Robert C. Moore, Erdenheim, Pa., assignors to Philco Corporation, Philadelphia, Pa., a corporation of Pennsylvania Application July 21, 1954, Serial No. 444,866

15 Claims. (Cl. 178—5.2)

The invention relates to color television systems and more particularly to color television systems wherein two signals representative of picture intelligence are transmitted as ampltiude modulations of a pair of mutually phase displaced subcarrier waves of nominally equal frequencies.

In color television systems of this general type, it is usually the chrominance intelligence, and in particular two signals representative of complementary chrominance components of the televised scene, which are transmitted by means of the aforementioned subcarrier waves. The luminance intelligence, on the other hand, is generally transmitted by means of a signal in a separate low frequency range. It is to be noted, in this connection, that the two chrominance representative subcarrier waves in question are usually additively combined prior to transmission. By reason of this combination, and by reason of the fact that they are at the same nominal frequency, the subcarrier waves lose their separate identities in the final transmitted signal and appear as a single carrier wave signal whose phase and amplitude are both subject to chrominance representative variations. However, since it is possible to recover the separate subcarrier waves by means of so-called synchronous detectors it is still appropriate, and very useful for certain analytical purposes, to consider these two subcarrier waves separately.

It has been realized for some time that the human eye is less sensitive to chrominance variations than to luminance variations and this has made it possible to utilize the chrominance representative signals with substantially less bandwidth than the luminance representative signals.

As a result of numerous subjective tests, it has been further ascertained that a picture which is particularly pleasing to the eye of the observer can be reproduced at the receiver if the chrominance signals, which are representative of changes between predominantly orange and predominantly cyan colors in the televised scene, are provided with appreciably greater bandwidths than the chrominance signals which are representative of changes between predominantly purple and predominantly green colors. At this point it should be noted that the former signal, namely that representing orange-cyan color changes, is called the "I" signal, while the latter, which represents purple-green color changes is called the "Q" signal. This conventional nomenclature will be used hereinafter. According to present standards these two chrominance signals are provided with bandwidths in the ratio of 2 to 1, the actual bandwidth being 1.2 megacycles for the I signal but only 0.6 megacycle for the Q signal. Once these chrominance signals have been utilized to modulate their respective subcarriers and once these subcarriers have been combined for transmission, then, within the frequency range which they have in common, the two modulation components are distinguishable only by the phases of the subcarriers which they modulate. Consequently, there must be transmitted, along with all the other components of the color television signal, a reference signal whose various parameters are independent of picture intelligence and whose phase bears fixed relationships to the phases of the unmodulated subcarriers. According to present practice, this reference signal is transmitted in the form of so-called color synchronizing bursts, each of which consists of a few cycles of a sinewave of subcarrier frequency and of reference phase, and each of which is superposed upon the so-called "backporch" of a horizontal line blanking pulse. This backporch is the trailing portion of the horizontal blanking pulse, the leading portion of the same pulse being occupied by a horizontal line synchronizing pulse in conventional manner. It will be understood, however, that the particular form of this reference signal is immaterial for our purpose.

It will now be apparent that it is of paramount importance to maintain the reference phase relationships between the color synchronizing bursts and the subcarriers with the utmost accuracy, for, if any variations between these phases are permitted to occur, then corresponding variations take place in the chrominance modulated subcarriers, the color bursts lose their utility as phase reference signals and improper coloration of the image reproduced at the receiver is likely to result. It is to be noted, in this connection, that color distortion from this cause occurs unpredictably and cannot be eliminated by any improvement, no matter how significant, in the other functions of the color television system.

At the receiver, a continuous signal derived from the intermittent color synchronizing bursts, and having the same frequency and phase as the latter, may be utilized to control the phases of a pair of locally generated carrier waves in such manner that these phases bear the same relationships to the phase of the color synchronizing bursts as the phases of the subcarrier waves produced at the transmitter bear to the phase of these same color synchronizing bursts. The two locally generated carrier waves may then be separately heterodyned with the received, chrominance modulated subcarrier wave, thereby to recover the different modulation components of this wave in separate channels. Here again it is clearly essential that the locally generated carrier waves be produced in accurate phase relation to the color synchronizing bursts; otherwise accurate demodulation of the modulated subcarrier waves and faithful reproduction of the chrominance representative modulation components thereof cannot be achieved.

An important parameter of the composite color television signal under consideration, which has not been discaused heretofore, is the absolute value of the phase relationship between the color burst signal (which is of reference phase) and each of the subcarrier waves. It has been found that this phase relationship is an important factor in determining the extent to which the color bursts produce visible indications of their presence in a black-and-white image which may be reproduced by means of the color television signal; in other words, this phase affects the so-called "compatibility" of the transmission system. It has also been determined, by means of numerous subjective tests, that this reference signal produces the least objectionable visual effect when it leads the I modulated subcarrier wave of the televised signal by approximately 57 degrees in phase. Since the I modulated wave in turn, leads the Q modulated subcarrier wave by 90 degrees in phase, the reference signal further leads the Q modulated wave by the sum of 57 and 90 degrees, i. e. by 147 degrees in phase. It has been found that, at the high subcarrier frequencies involved (3.58 megacycles by present standards) it is not possible to maintain all phase relationships between different signal waves with equal ease. In fact it has been found that only certain specific phase relations, namely those of phase equality, phase quadrature and phase opposition—in other words, phase relationships which are integral multiples of ninety degrees—can be maintained by means of apparatus which is both simple and reliable. All other phase relationships, such as, for example, the preferred phase relationships between the color bursts and the chrominance modulated subcarriers under consideration, can be maintained only by means of relatively complicated and costly equipment. While this is, of course, undesirable in any case, still, at a transmitter, even the relatively costly equipment required for this purpose may represent only a small fraction of the total investment and therefore may not constitute an altogether insurmountable obstacle. In a receiver, on the other hand, where it is essential to keep complications and resultant costs to a minimum, the complexity of this phasing equipment may well result in an uncommercially priced product.

Accordingly, it is a primary object of the invention to provide an improved system for processing a carrier wave which represents the sum of two amplitude modulated subcarrier waves having different phases.

It is another object of the invention to provide an improved system for processing a carrier wave which represents the sum of two separate intelligence modulated subcarrier waves in a desired phase relationship, this system being characteribed by the accurate maintenance of the desired relationship by means of comparatively inexpensive apparatus.

It is still another object of the invention to provide simplified circuits for processing the color intelligence representative signals produced in a color television system.

It is a still further object of the invention to provide simplified signal processing circuits at the transmitter and/or at the receiver of color television signals which include differently phased chrominance modulated subcarriers of equal nominal frequencies and also a signal of reference phase for these subcarriers.

To achieve the foregoing objectives, as well as others which will appear, a transmitter and/or a receiver embodying our invention is provided with means for producing three unmodulated subcarrier waves, instead of two, as heretofore. Of these three subcarrier waves one is produced in phase quadrature relation to the transmitted color bursts, another is produced in phase opposition to the color bursts and the third is produced in the same phase relation to the color bursts as the subcarrier wave which has heretofore been modulated with the chrominance signal transmitted with the wider frequency band. Under the present signal standards this means that the third subcarrier wave is produced with the phase of the I subcarrier, that is lagging the color bursts by approximately 57 degrees in phase.

For best results, the aforedescribed three subcarrier waves should be provided both at the transmitter and at the receiver, although a considerable improvement will result even if the invention is practiced only at one terminal of the system. At a transmitter, the two subcarrier waves which are produced in phase quadrature and in phase opposition to the color bursts are modulated with those components of two different chrominance signals which lie below the highest frequency which the conventional I and Q chrominance signals have in common, and the third subcarrier wave is modulated with those components of a conventional I signal which exceed the aforementioned frequency. However, the signals with which the two first-mentioned subcarrier waves are respectively modulated are no longer the I and Q signals proper but are different combinations of fractions of these signals. The manner in which these new modulating signals are produced, and their relationships to conventional I and Q signals, will be discussed in detail hereinafter.

At a receiver embodying our invention, the composite received subcarrier wave, which consists of the sum of all the chrominance modulated subcarrier waves produced at the transmitter, is heterodyned separately with each of three unmodulated subcarrier waves produced in the aforedescribed phase relations. The heterodyning operation between the received wave and the two unmodulated carrier waves which are in phase quadrature and phase opposition to the color bursts yield those modulation components which correspond to the 0 to 0.6 megacycle frequency components of the I and Q signals, while the heterodyning operation between the received wave and the third unmodulated wave yields those frequency components of the I signal which exceed 0.6 megacycle.

In such a system it is clearly possible to reproduce the 0 to 0.6 megacycle frequency components of the chrominance signals with much greater fidelity than heretofore because these low frequency components are transmitted and recovered by means of subcarrier waves whose phases can be maintained accurately and yet inexpensively.

Particular forms of the apparatus suitable for practicing our invention are described in detail hereinafter and are illustrated in the accompanying drawings wherein.

Figure 1:
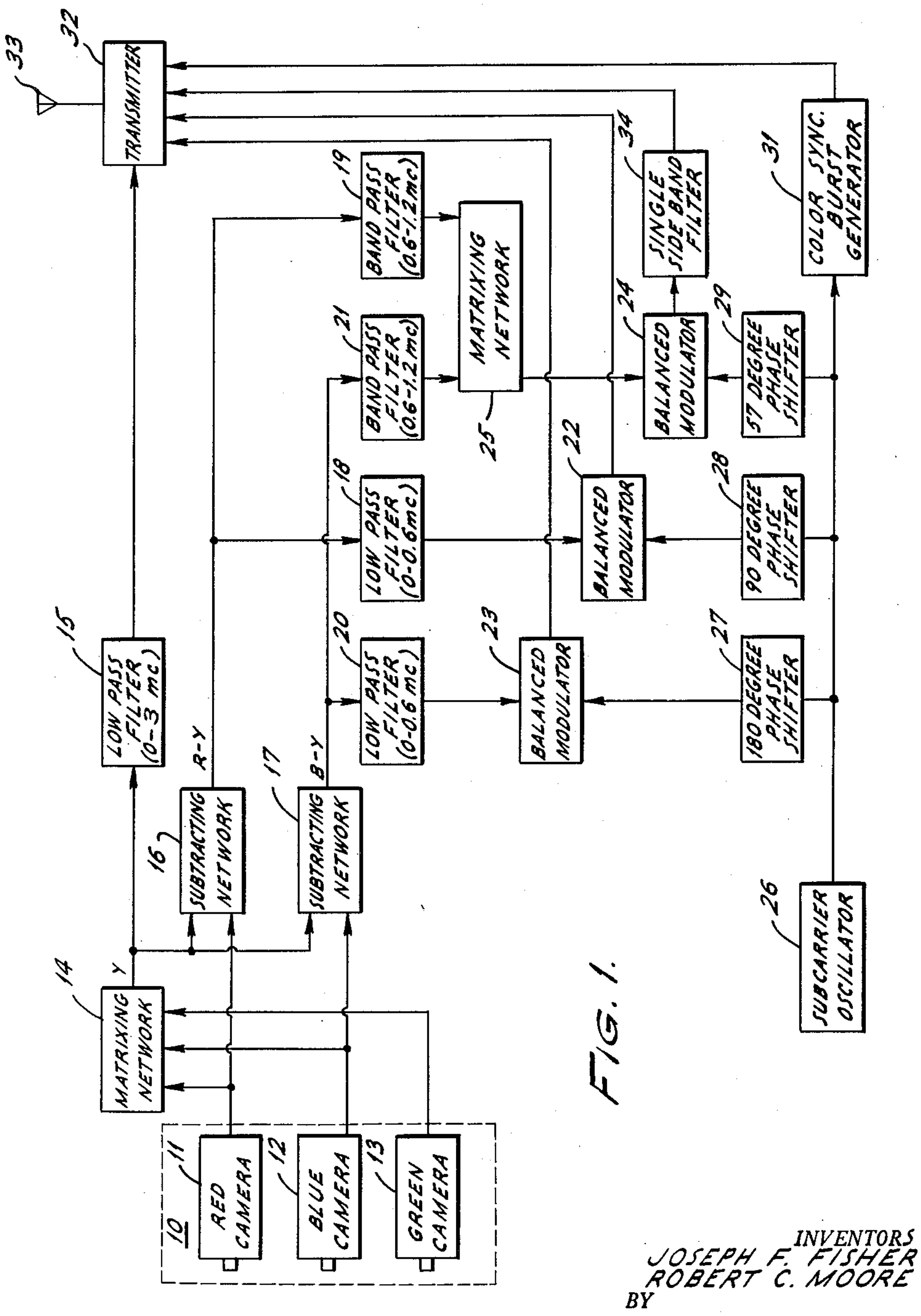
Figure 1 shows a color television transmitter embodying our invention.

The color television transmitter illustrated in Figure 1 of the drawings, to which more particular reference may now be had, comprises a camera system 10 which may be of any conventional form. For example, this camera system may comprise three separate television cameras 11, 12 and 13 which scan in synchronism the scene which is to be televised and which view this scene, respectively, through filters transmissive only of red, blue and green light. At the output terminals of these cameras there are therefore available separate signals which are respectively representative only of the red, blue and green color information regarding simultaneously scanned portions of the televised scene. The output signals from all three of these cameras are now supplied to the appropriate input circuits of a matrixing network 14 wherein they are combined in suitable proportions to produce for transmission a luminance signal having any desired composition. According to the standards which have recently been adopted for this country the luminance signal which is formed by this matrixing network should be constituted of a signal equal to the sum of 0.30 times the red camera output signal, 0.11 times the blue camera output signal and 0.59 times the green camera output signal. A matrixing network suitable for this application may take any conventional form and may, for example, consist simply of a resistive adding circuit with the constituent resistors selected with such relative values that the signals supplied thereto are combined in the afore-stated proportions. The luminance signal produced by matrixing network 14 is then supplied to a plurality of signal utilization devices, one of which is low-pass filter 15, which may be constructed to transmit only signal components in the 0 to 3 megacycle frequency range. Other devices to which the output signal from matrixing circuit 14 is also supplied are the two subtracting networks 16 and 17, both of which are of conventional construction. The subtracting network 16 is also supplied with the output signal from the red camera 11, while the subtracting network 17 is additionally supplied with the output signal from the blue camera 12. As a result there appears at the output terminals of subtracting network 16 a signal which is equal to the difference between the red camera output signal and the luminance signal derived from the output circuit of matrixing network 14. At the output of subtracting network 17, on the other hand, there appears a signal which is equal to the difference between the blue camera output signal 12 and the same luminance signal from matrixing network 14. In accordance with conventional terminology, the respective output signals from subtracting circuits 16 and 17 will hereinafter be referred to as the R—Y and the B—Y signals, R and B being the symbols which are conventionally used to designate the output signals from the red and blue cameras, respectively, while Y is the symbol which is conventionally used to represent the luminance signal derived in the manner hereinbefore described from the output signals of all three color cameras. The R—Y signal from subtracting network 16 is now simultaneously supplied to a low-pass filter 18 and to a bandpass filter 19. Each of these filters is of entirely conventional construction, the low-pass filter being constructed to transmit signal components in the 0 to 0.6 megacycle frequency range to the substantial exclusion of all other signals while the bandpass filter 19 is constructed to transmit signal components in the 0.6 to 1.2 megacycle frequency range to the substantial exclusion of signals at all other frequencies. The B—Y output signal from subtracting network 17, on the other hand, is simultaneously supplied to two other filter networks 20 and 21 having, respectively, the same frequency response characteristics as the two filter networks 18 and 19 to which the R—Y signal is supplied. In fact, the construction of filter 20 may be identical to that of filter 18 while the construction of filter 21 may be identical to that of filter 19. The band-limited output signals from low-pass filters 18 and 20 are supplied, through separate channels to separate mixers 22 and 23, respectively, while the band-limited output signals from bandpass filters 19 and 21 are both supplied to a third mixer 24, after combination in a matrixing network 25 in proportions which will be stated hereinafter. The second input circuit of each of mixers 22, 23 and 24 is supplied with a signal derived from subcarrier oscillator 26, which may be of any conventional construction suitable for the production of high frequency signals of substantially sinusoidal form. In practice this oscillator is so constructed as to produce a signal at approximately 3.58 megacycles. This subcarrier signal from oscillator 26 is supplied to each of mixers 22, 23 and 24 through suitable phase shifting devices 27, 28 and 29 which are conventionally constructed so that the signal from the oscillator reaches the input circuit of mixer 23 in a phase opposite to that in which it is produced by subcarrier oscillator 26, so that it reaches the input circuit of mixer 22 in a phase which lags by 90 degrees the phase in which it is produced, and so that it reaches the input circuit of mixer 24 in a phase which lags by 57 degrees the phase in which it is produced. To this end the phase shifter 27 may take the form of a conventional phase inverter vacuum tube whose control grid is supplied with the signal from oscillator 26 and which produces at its anode a signal which is, in form, a replica of the supplied signal but which has a phase opposite to that of the supplied signal. The phase shifter 28 may take the form of a conventional quadrature transformer, this being a transformer whose primary and secondary windings are each tuned to parallel resonance at the nominal frequency of the signal from oscillator 26. Both of these phase shifters 27 and 28 are characterized by extreme simplicity coupled with extreme precision. The phase shifter 29, on the other hand, may consist simply of a resistance-capacitance delay network whose components are selected in conventional manner to produce the desired 57 degree phase delay. This latter form of phase shifter is extremely simple but not very precise, particularly under conditions of varying signal frequency. However, it will be recalled that its output is used for a purpose for which extreme precision is not required. In addition to being supplied to the various mixers in the aforedescribed manner, the signal from subcarrier oscillator 26 is also supplied to a conventional color synchronizing burst generator where it is used to produce a burst, i. e. a few cycles, of a signal having the same frequency and phase as the sub-carrier signal but occurring only during each blanking interval of the camera scanning operation, and more particularly during that portion of each such blanking interval which is not occupied by the conventional horizontal line synchronizing pulse. The output signal from this color synchronizing burst generator 31, the output signal from low-pass filter 15 and the output signals from each of mixers 22, 23 and 24 are then supplied to a conventional transmitter 32 which may comprise suitable signal combining circuits, a source of a carrier wave signal and means for utilizing the signals supplied thereto from the various elements hereinbefore enumerated for modulating the carrier wave, means for amplifying the modulated carrier wave and means for supplying it to antenna 33 for radiation therefrom. These circuits of transmitter 32 may be exactly like the corresponding circuits found in conventional black-and-white television transmitters so that their detailed description is unnecessary.

The operation of the foregoing system is as follows. A luminance signal of conventional form, band-limited to the 0 to 3 megacycle frequency range, is formed by the cooperation of the red, blue and green cameras, the matrixing network 14 and low-pass filter 15. In addition two complementary chrominance components, namely the aforementioned R—Y and B—Y signals are formed by subtraction of the Y signal (produced by matrixing network 14) from each of the output signals from the red and blue cameras. It will be apparent, however, that the outputs of subtracting networks 16 and 17 both contain not only frequency components within that frequency range which standard I and Q signals have in common, but also components in that higher frequency range in which the standards permit only transmission of the I signal. In low-pass filters 18 and 20 there are therefore selected, for further processing, only frequency components in the aforementioned common frequency range, i. e. the 0 to 0.6 megacycle range in the exemplary case under consideration. The components of the R—Y and B—Y signals which have been thus selected are respectively utilized, in balanced modulators 22 and 23, for the double sideband modulation of the subcarrier waves which are also applied to these modulators. In normal operation each of these modulators will produce an output signal of the nominal frequency of the subcarrier wave supplied thereto and having both upper and lower sideband components of amplitude proportional to the amplitude of the chrominance signal which is also supplied thereto. These output signals will therefore occupy a frequency range of approximately 1.2 megacycles centered about the nominal subcarrier frequency.

It may be shown, by the application of entirely conventional principles of colorimetric and vector analysis, that the R—Y modulated subcarrier wave, produced in the manner hereinbefore described, has an amplitude A′ which can be expressed algebraically by the equation:

$$A'' = -A_I \sin \theta + A_Q \cos \phi \qquad (2)$$

where $A_I$ is the amplitude which a conventional I modulated subcarrier wave representing the same televised scene would have, $A_Q$ is the amplitude which a conventional Q modulated subcarrier wave representing the same scene would have, $\theta$ is the phase angle between a conventional I subcarrier wave and the actual R—Y modulated subcarrier wave, and $\phi$ is the phase angle between a conventional Q subcarrier wave and the actual B—Y modulated subcarrier wave.

Similarly for the B—Y modulated subcarrier wave it may be shown that its amplitude A″ can be expressed by the equation;

$$A'' = -A_I \sin \theta + A_Q \cos \phi \qquad (2)$$

By means of the foregoing equations it can further be shown that the composite signal which results from the additive combination of the R—Y and B—Y modulated subcarrier waves, within any given frequency range, is entirely indistinguishable from the composite signal which would have been produced if, instead, conventional I and Q modulated subcarrier waves lying within this frequency range had been produced and combined. Thus, so far as the chrominance signal components in the 0 to 0.6 megacycle frequency range are concerned, they are accurately represented by the combined output signals from balanced modulators 22 and 23 in Figure 1 even though only unmodulated subcarrier waves in phase quadrature and in phase opposition to the reference signal have been used in the production of these combined signals.

It is to be noted that the validity of the aforestated conclusion is readily susceptible of demonstration not only by mathematical analysis but also by experiment.

By reason of their particular frequency response characteristics, bandpass filters 19 and 21, on the other hand, select those frequency components of the R—Y and B—Y signals produced by subtracting networks 16 and 17 respectively which lie in that portion of the frequency range of the conventional I signal which is an excess of the frequency range of the conventional Q signal. Accordingly, at the output terminals of filters 19 and 21 there will be available those frequency components of the R—Y and B—Y signals, respectively, which lie in the 0.6 to 1.2 megacycle frequency range. These output signals are supplied to matrixing network 25 which is essentially a linear combining circuit whose components are so proportioned that the output signal which it produces is equal to 0.74 times the output signal from filter 19 less 0.27 times the output signal from filter 21. This last-mentioned output signal is identical to those components of an I signal produced by conventional methods which lie in the 0.6 to 1.2 megacycle frequency range. Application to the balanced modulator 24 of this signal from matrixing network 25, together with the signal derived from subcarrier oscillator 26 in the manner hereinbefore explained, results in the production of both the upper and lower modulation sidebands of a signal which corresponds in every respect to those portions of a conventionally produced I modulated subcarrier wave which occupy the frequency range extending beyond that frequency range which is common to both I and Q modulated waves. Because it is desired to transmit only a single sideband of the output signal from modulator 24, this signal is applied to filter 34 which filters out its upper sideband and transmits only signals of the nominal subcarrier frequency or lower. The signal which is transmitted by this filter is then combined in transmitter 32 with the output signals from balanced modulators 22 and 23, whereby there is produced a composite chrominance subcarrier which is indistinguishable from the chrominance modulated subcarrier formed by prior art techniques, namely by the modulation of two subcarrier waves differing from the reference wave by 57 and 147 degrees in phase with I and Q chrominance signals respectively.

It will now be apparent that the composite chrominance subcarrier formed by the system of Figure 1 is subject to misphasing of the chrominance subcarrier components to a considerably lesser degree than a signal produced by prior art techniques. This improvement is due to the fact that the low frequency modulation components of this composite subcarrier are formed by the modulation of subcarrier waves whose phase differs from that of the reference waves by multiples of 90 degrees rather than by arbitrary angles such as 57 or 147 degrees. The high frequency modulation components formed in balanced modulator 24, on the other hand, continue to be subject to phase errors which are at least as great as those occurring in prior art arrangements and sometimes even slightly greater, but the effect of phase errors in these high frequency components is, as has been previously pointed out, so much less noticeable to an observer than corresponding errors in the low frequency components that a substantial net gain in picture acceptability results.

It will also be seen that the transformation of the reference waves from oscillator 27 into the subcarrier waves in quadrature and opposing phase relation which are required for application to balanced modulators 22 and 23 can be carried out by means of equipment which is extremely accurate and yet extremely simple. Since, as has been pointed out, the phase of the subcarrier wave which is shifted by 57 degrees from reference phase is no longer critical, the simple and inexpensive additional equipment which is provided in the system of Figure 1 for the further derivation of this subcarrier wave is sufficiently accurate for all practical purposes.

It has been pointed out previously that our basic inventive concept can be applied to a receiver for a color television signal of the form under consideration, as well as to a transmitter of such a signal. The manner in which this may be done will be more clearly understood from a consideration of Figure 2 of the drawings wherein there is illustrated one form which a receiver embodying our inventioin may take and to which reference may now be had. The system illustrated in Figure 2 comprises an antenna 40 adapted to intercept signals radiated from a color television transmitter and operative to supply these signals to a number of conventional circuits which are collectively designated as receiver 41 in Figure 2. These conventional circuits may comprise the usual radio frequency amplifier, converter, intermediate frequency amplifier and video detector, all of which are found in black-and-white receivers as well as in color television, so that they need not be described in detail. As a result of the conventional operation of the foregoing circuits there is available at the output of receiver 41 a composite color television signal reduced to its lowest or video frequency range and comprising, in accordance with the signal standards under consideration, a luminance signal occupying at least the 0 to 3 megacycle frequency range and a chrominance subcarrier occupying the 2.4 to 4.2 megacycle frequency range, together with the usual scanning and color synchronizing signals. Since the practicing of our invention does not involve the luminance signal in any way, the illustration and description of Figure 2 have been simplified by omitting all references to the separate channel which this luminance signal normally follows between the output of receiver 41 and the signal display device to which it is eventually supplied. The chrominance subcarrier, on the other hand, is directed into its separate channel by means of high pass filter 42 which is conventionally constructed to transmit only signals of a frequency in excess of 2.4 megacycles. This filter therefore rejects most of the luminance signal but transmits the chrominance subcarrier. In addition this filter also transmits the color synchronizing bursts which are normally provided for the aforedescribed purposes along with other portions of the composite signal and which have, as has been indicated, the same frequency as the chrominance subcarrier, namely 3.58 megacycles in the case under consideration. At the output of high pass filter 42 these color bursts are preferably separated from other portions of the chrominance signal. This may be accomplished by supplying the output of filter 42 to a color burst separator 43 which may take a variety of conventional forms. For example this color burst separator may be a gated vacuum tube amplifier which is normally maintained in a condition in which it is non-transmissive of applied signals. This may be accomplished by the application of suitable bias potentials to the control grid electrode of the vacuum tube. This amplifier is then supplied with a gating signal which renders it transmissive, for short intervals, of signals supplied thereto from filter 42. Since the color bursts are present in the color television signal during the horizontal blanking intervals, and since the chrominance subcarrier has zero amplitude during these same intervals, the color bursts can be completely separated from other signal components merely by timing the occurrence of the gating signal in such a manner that it will render the amplifier transmissive only during the blanking intervals. This may be done conveniently by deriving the gating signal from the horizontal synchronizing pulse. Since this pulse occurs immediately before each color synchronizing burst it is well adapted to serve as a gating signal for this burst. No special equipment is needed since this pulse is derived in every conventional receiver deflection system of which we are aware, for other purposes. The output from filter 42 is supplied not only to color burst separator 43 but also to three different demodulators designated in Figure 2 by reference numerals 44, 45 and 46 respectively. The color synchronizing bursts derived by separator 43, on the other hand, are supplied to a conventional cohered oscillator 47 where they serve in the usual manner to maintain the continuous output signal produced by the oscillator in substantially the same frequency and phase as the intermittently occurring color bursts. Accordingly there is available, at the output of cohered oscillator 47, a continuous signal of substantially sinusoidal form having substantially the same frequency and phase as the color bursts. This output signal from oscillator 47 is now also supplied to each of demodulators 44, 45 and 46, not directly, but through phase shifting devices 48, 49 and 50, which may be substantially identical to the phase shifting devices 27, 28 and 29 of Figure 1, respectively. In particular, the output signal from cohered oscillator 47 is supplied to demodulator 44 by way of phase inverter 48, to demodulator 45 by way of quadrature transformer 49 and to demodulator 46 by way of resistance-capacitance network 50. Consequently there will be supplied to demodulator 44 a signal whose phase differs from that of the signal produced by cohered oscillator 47, and therefore also from that of the color synchronizing bursts, by an amount equal to that by which the phase of the subcarrier wave supplied to the B—Y modulator at the transmitter differs from the phase of the same color synchronizing burst. Since demodulator 44 is supplied not only with a continuous signal of this phase but also with the chrominance subcarrier from high pass filter 42, this demodulator will evidently be effective to derive from the chrominance subcarrier the B—Y modulation component reduced to its lowest or video frequency range. It will further be noted that the signal which is supplied to demodulator 45 from cohered oscillator 47 bears the same phase relation to the color synchronizing bursts as the signal which, in the transmitter system of Figure 1, is supplied to the R—Y modulator, and also that the signal supplied to demodulator 46 bears the same phase relation to the color synchronizing bursts as the signal which, at the transmitter is supplied to the I modulator. The demodulators 45 and 46 will therefore produce signals which correspond, respectively, to the R—Y and I modulation components of the chrominance subcarrier, likewise reduced to their lowest, or video frequency ranges. The output signals from demodulators 44 and 45 are now respectively supplied to low-pass filters 47 and 48 which are conventionally constructed to transmit only signals in the 0 to 0.6 megacycle frequency range. The signals which appear at the outputs of these low-pass filters will then correspond substantially exactly to those low-frequency components of the B—Y and R—Y signals produced at the transmitter which are transmitted by double sideband modulation and which occupy the frequency range which the conventional I and Q chrominance signals have in common. The accuracy with which these B—Y and R—Y low frequency components are reproduced depends to a great extent upon the accuracy with which the phase of the signals from cohered oscillator 47 is maintained. Since only a phase inversion and a quadrature phase transformation are involved in the derivation of these signals from the cohered oscillator, the simple phase shifting devices described are quite capable of maintaining the desired phase relationships with sufficient accuracy. Consequently, faithful reproduction at the receiver of the low frequency components of the B—Y and R—Y signals is assured. The output signal from demodulator 46, on the other hand, corresponds to those frequency components of a conventional I signal which exceed the frequency range which is common to the I and Q signals. However, it will be recalled that the corresponding modulation signal was formed at the transmitter by matrixing, i. e. by adding in proper relative proportions the high frequency components of the B—Y and R—Y signals derived from the camera system. The signal produced by demodulator 46 can therefore again be broken up into components which correspond as nearly as possible to its B—Y and R—Y constituents, simply by supplying it to separate channels with amplitudes which are in the ratio of 110 to 96. This signal division may be carried out conveniently by means of resistors 49 and 50 connected in series between the output terminal of demodulator 46 and a point of fixed reference potential, such as ground and having resistance values in the ratio of 14 to 96. The high frequency components of the B—Y signal are then developed across the series combination of resistors 49 and 50 while the corresponding components of the R—Y signal are developed across resistor 50 alone. The signals which are thus developed are respectively supplied to separate bandpass filters 51 and 52, each of which is constructed in the conventional manner to transmit substantially exclusively signals in the 0.6 to 1.2 megacycle frequency range. At the output of filter 51 there will therefore appear those components of the transmitted R—Y signal which lie in the frequency range of the conventional I signal component in which only this signal component should be transmitted, while at the output of bandpass filter 52 there will be available the B—Y signal component formed at the transmitter within the same frequency range. The accuracy with which each of these signals is reproduced will depend upon the accuracy with which the 57 degree phase relationship is maintained between the signal applied to demodulator 46 and the signal produced by cohered oscillator 47. Evidently the simple phase shifting network by means of which this odd phase relationship is produced does not lend itself to the extremely accurate maintenance of this phase relationship. However it has been noted before that variations in the high frequency components of the R—Y and B—Y signals produce visible effects in the reproduced image which are not nearly so offensive as variations of corresponding magnitude in the low frequency components of the same signals. In fact, subjective experiments have revealed that errors in these high frequency video components, resulting from the demodulation in improper phase in demodulator 46, will remain unnoticed by the vast majority of observers. Consequently the simple phase shifting device used to supply demodulator 46 is adequate.

Figure 2:
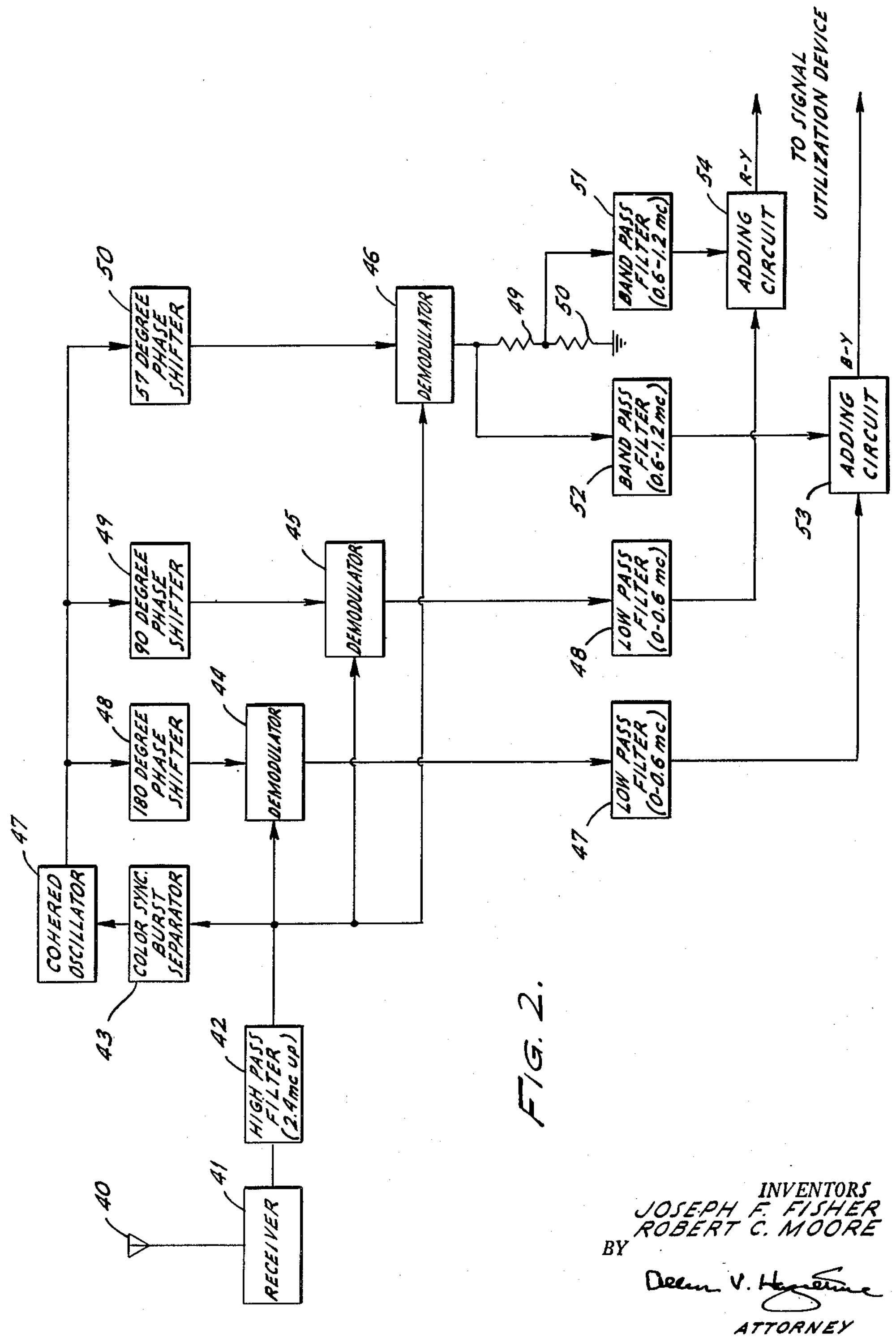
Figure 2 shows a color television receiver which embodies our invention and which is adapted to produce an image of a televised scene in response to a signal of the form produced, for example, by the transmitter illustrated in Figure 1.

In most cases it is now desirable to combine the low frequency and high frequency components of the B—Y and R—Y signals respectively. This may be done, as illustrated in Figure 2, by supplying the output signals from low-pass filter 47 and bandpass filter 52 to a subtracting circuit 53 and by supplying the output signals from low-pass filter 48 and bandpass filter 51 to an adding circuit 54. At the output terminals of these respective combining circuits there will then appear the B—Y and R—Y chrominance signals with full 0 to 1.2 megacycle bandwidths, subject only to minor errors in their high frequency components.

The particular manner of utilization of the B—Y and R—Y signals formed as hereinbefore explained forms no part of our invention and need therefore not be discussed in detail. Suffice it to say that a number of conventional systems for utilizing these signals are known, as for example one in which the B—Y and R—Y signals are first matrixed to produce an additional signal, conventionally called the G—Y signal and representative of the difference between the green camera output signal and the luminance signal formed at the transmitter in the manner explained in connection with Figure 1. Each of these three chrominance signals may then be combined with the luminance signal, derived from receiver 41 through a separate channel (not shown) in conventional manner, to reconstitute essentially the red, green and blue camera output signals produced at the transmitter. These red, green and blue signals may then be separately utilized to control the beam intensities of three simultaneously scanning cathode ray tubes, the tube whose beam is controlled with the green representative signal having a screen structure emissive of light of green color in response to beam impingement while the tube which is supplied with the blue signal has a blue light emissive screen, and the tube supplied with the red signal has a red light emissive screen. There will thus be formed on the screens of these three cathode ray tubes three separate reproductions of the televised scene containing respectively the red, green and blue color components of the same. These three images can then be optically superposed to present to the observer a single image of the televised scene containing all three primary color components in additive combination. It will be understood that the signal utilization means hereinbefore briefly described is only one of numerous forms which this utilization means may take. Other, and more refined forms of utilization means, involving time multiplexing of the chrominance signal and other highly ingenious techniques are also available to those skilled in the art, but, since our invention is applicable to the formation of the basic received signal components which must be made available to any of these conventional utilization means, the latter need not be described in detail.

It will be understood that apparatus embodying our invention may take a variety of specific forms other than those which have been illustrated in the drawings. Accordingly we desire our inventive concept to be limited only by the scope of the appended claims.

We claim:

1. A system for forming a carrier wave which is modulated in phase and amplitude with intelligence signals having components below and above a predetermined frequency value, said system comprising: means for producing first and second alternating signals of the nominal frequency of said carrier wave and in mutual quadrature phase relation; means for producing a third alternating signal of said nominal frequency and having a phase which differs from the phases of said first and second alternating signals by amounts different from an integral multiple of ninety degrees; means for modulating said first and second alternating signals respectively with components of two different intelligence signals which lie below said predetermined frequency value; means for modulating said third alternating signal with components of both said intelligence signals which lie above said predetermined frequency value; and means for algebraically combining the signals produced by all of said modulating means.

2. A system for forming a carrier wave which is modulated in phase and amplitude with intelligence signals having components below and above a predetermined frequency value, said system comprising: a source of a first alternating signal of the nominal frequency of said carrier wave and of reference phase; means for deriving from said first alternating signal second and third signals having said nominal frequency and having phases which are related to said reference phase by odd and even integral multiples of ninety degrees, respectively; means for deriving from said first signal a fourth signal of said nominal frequency and having a phase which differs from said reference phase by an amount which is different from an integral multiple of ninety degrees; means for modulating said second and third signals respectively with components of two different intelligence signals which lie below said predetermined frequency value; means for modulating said fourth signal with components of both said intelligence signals which lie above said predetermined frequency value; and means for algebraically combining the signals produced by all of said modulating means.

3. A system for forming a carrier wave which is modulated in phase and amplitude with intelligence, said system comprising: a source of a first alternating signal of the nominal frequency of said carrier wave and of reference phase; means for deriving from said alternating signal second and third signals having said nominal frequency and having phases which are related to said reference phase by odd and even integral multiples of ninety degrees, respectively; means for deriving from said first signal a fourth signal of said nominal frequency and having a phase which differs from said reference phase by an amount which is different from an integral multiple of ninety degrees; means for producing first and second intelligence signals each having components below and above a predetermined frequency value; means for modulating said second and third derived signals respectively with components of said first and second intelligence signals which lie below said predetermined frequency value; means for modulating said fourth derived signal with components of both said intelligence signals which lie above said predetermined frequency value; and means for algebraically combining the signals produced by all of said modulating means.

4. The system of claim 3 further characterized in that said first and second intelligence signals are signals respectively representative of complementary chrominance components of a televised scene.

5. A system for forming a carrier wave which is modulated in phase and amplitude with intelligence signals having components below and above a predetermined frequency value, said system comprising: a source of a first alternating signal of the nominal frequency of said carrier wave and of reference phase; means for deriving from said first alternating signal second and third signals having said nominal frequency and having phases which differ from said reference phase by 90 and 180 degrees, respectively; means for deriving from said first signal a fourth signal of said nominal frequency and having a phase which differs from said reference phase by substantially 57 degrees; means for modulating said second and third signals respectively with components of two different intelligence signals which lie below said predetermined frequency value; means for modulating said fourth signal with components of both said intelligence signals which lie above said predetermined frequency; and means for algebraically combining the signals produced by all of said modulating means.

6. A system for forming a carrier wave which is modulated in phase and amplitude with intelligence signals having components below and above a predetermined frequency value, said system comprising: a source of a first alternating signal of the nominal frequency of said carrier wave and of reference phase; a quadrature transformer supplied with said first alternating signal and operative to produce a second alternating signal of said nominal frequency and having a phase which differs from said reference phase by 90 degrees; a vacuum tube phase inverter supplied with said first alternating signal and responsive thereto to produce a third alternating signal of said nominal frequency and having a phase which differs from said reference phase by 180 degrees; a resistance-capacitance phase shifting network supplied with said first alternating signal and constructed and arranged to be responsive thereto to produce a fourth alternating signal of said nominal frequency and having a phase which differs from said reference phase by substantially 57 degrees; means for modulating said second and third alternating signals respectively with those components of two different intelligence signals which lie below said predetermined frequency value; means for modulating said fourth alternating signal with those components of both said intelligence signals which lie above said predetermined frequency value; and means for algebraically combining the signals produced by all of said modulating means.

7. A system for demodulating a carrier wave which is subject to phase and amplitude variations in accordance with intelligence modulation components above and below a predetermined frequency value, said system comprising: means for producing a first alternating signal of the same nominal frequency as said carrier wave and of reference phase for said carrier wave; means for deriving from said first signal second and third signals of said nominal frequency and having phases which are related to said reference phase by odd and even integral multiples of ninety degrees, respectively; means for deriving from said first signal a fourth signal also of said nominal frequency and having a phase which differs from said reference phase by an amount different from an integral multiple of ninety degrees; means for heterodyning each of said derived signals separately with a signal derived from said modulated carrier wave; means for deriving in separate channels heterodyne components produced by said heterodyning means in response to said second and third derived signals respectively and to said carrier wave derived signal and lying below said predetermined frequency value; means for deriving in at least one additional channel heterodyne components produced by said heterodyning means in response to said fourth derived signal and to said carrier wave derived signal and lying above said predetermined frequency value; and means for algebraically combining different fractions of said last-mentioned heterodyne components with respective ones of said first-mentioned heterodyne components.

8. A system for demodulating a carrier wave which is subject to phase and amplitude variations in accordance with intelligence modulation components above and below a predetermined frequency value, said system comprising: means for producing a first alternating signal of the same nominal frequency as said carrier wave and of reference phase for said carrier wave; means for deriving from said first signal second and third signals of said nominal frequency and having phases which are related to said reference phase by odd and even integral multiple of 90 degrees; means for heterodyning each of from said first signal a fourth signal also of said nominal frequency and having a phase which differs from said reference phase by an amount different from an integral multiple of 90 degrees; means for heterodyning each of said derived signals separately with said modulated carrier wave; means for deriving in separate channels heterodyne components produced by said heterodyning means in response to said second and third derived signals respectively and to said carrier wave and lying below said predetermined frequency value; means for deriving in at least one additional channel heterodyne components produced by said heterodyning means in response to said fourth signal and to said carrier wave and lying above said predetermined frequency value; and means for algebraically combining different fractions of said last-mentioned heterodyne components with respective ones of said first-mentioned heterodyne components.

9. In a color television receiver: a source of a carrier wave which is subject to phase and amplitude variations in accordance with intelligence signals which are representative of complementary chrominance components of a televised scene and which have components above and below a predetermined frequency value; means for producing a first demodulating signal of the same nominal frequency as said carrier and of reference phase for said carrier wave; means for deriving from said alternating signal first and second demodulating signals of said nominal frequency and having phases which are related to said reference phase by odd and even integral multiples of 90 degrees, respectively; means for deriving from said alternating signal a third demodulating signal also of said nominal frequency and having a phase which differs from said reference phase by an amount different from an integral multiple of 90 degrees; means for heterodyning each of said demodulating signals separately with a signal derived from said modulated carrier wave; means for deriving in separate channels heterodyne components produced by said heterodyning means in response to said first and second demodulating signals respectively and to said carrier wave and lying below said predetermined frequency value; means for deriving in a separate channel heterodyne components produced by said heterodyning means in response to said third demodulating signal and to said carrier wave and lying above said predetermined frequency value; and means for algebraically combining different fractions of said last-mentioned heterodyne components with respective ones of said first-mentioned heterodyne components.

10. The system of claim 9 further characterized in that said first, second and third derived demodulating signals differ in phase from said alternating signal of reference phase by 90 degrees, 180 degrees, and substantially 57 degrees, respectively.

11. A system for forming a composite color television signal comprising components representative of the luminance of a televised scene and lying within a predetermined range of frequencies, a subcarrier wave which is modulated in phase and amplitude with intelligence signals representative of the chrominance of the televised scene and which has a nominal frequency near one end of said frequency range, and color synchronizing bursts of said nominal frequency occurring during horizontal blanking intervals and having reference phase for said subcarrier wave, said system comprising: a source of a first alternating signal of the nominal frequency of said subcarrier wave and of reference phase; means for deriving from said first alternating signal bursts of a signal at said nominal frequency which occur during said horizontal blanking intervals and which bear a predetermined phase relation to said first alternating signal; means for deriving from said first alternating signal a second signal having said nominal frequency and having a phase which is related to said reference phase by substantially an integral multiple of ninety degrees; means for deriving from said first signal a third signal of said nominal frequency and having a phase which differs from said reference phase by an amount which is substantially different from an integral multiple of ninety degrees; means for modulating said second and third signals respectively with components of two signals representative of different chrominance aspects of said televised scene and each lying within a portion of said predetermined range of frequencies; and means for algebraically combining the signals produced by said modulating means.

12. A receiver for a composite color television signal comprising components representative of the luminance of a televised scene and lying within a predetermined range of frequencies, a subcarrier wave which is subject to phase and amplitude modulation representative of the chrominance of the televised scene and which has a nominal frequency located near one end of said range, and color synchronizing bursts of said nominal frequency occurring during horizontal blanking intervals and having reference phase for said subcarrier wave, all of said components comprised in said composite signal being modulated on a common carrier wave, said receiver comprising: means responsive to said received composite signal to produce a first signal having alternations of said nominal frequency in fixed phase relation to the alternations of said bursts; means controlled in accordance with said first signal for producing a second signal of said nominal frequency and having a phase which is related to the phase of said first produced signal by substantially an integral multiple of ninety degrees; means controlled in accordance with said first signal for producing a third signal of said nominal frequency and having a phase which differs from the phase of said first produced signal by an amount substantially different from an integral multiple of ninety degrees; means for heterodyning said second produced signal with a signal derived from said modulated subcarrier wave; means for heterodyning said third produced signal with a signal derived from said modulated subcarrier wave; and means for selectively deriving in separate channels the difference frequency heterodyne components produced by said heterodyning means, respectively.

13. A receiver for a composite color television signal comprising components representative of the luminance of a televised scene and lying within a predetermined range of frequencies, a subcarrier wave which is subject to phase and amplitude modulation representative of the chrominance of the televised scene and which has a nominal frequency located near one end of said range, and color synchronizing bursts of said nominal frequency occurring during horizontal blanking intervals and having reference phase for said subcarrier wave, all of said components comprised in said composite signal being modulated on a common carrier wave, said receiver comprising: means responsive to said received composite signal to produce a first signal having alternations of said nominal frequency in fixed phase relation to the alternations of said bursts; means controlled in accordance with said first signal for producing a second signal of said nominal frequency and having a phase which is related to the phase of said first produced signal by substantially an integral multiple of ninety degrees; means controlled in accordance with said first signal for producing a third signal of said nominal frequency and having a phase which differs from the phase of said first produced signal by an amount substantially different from an integral multiple of ninety degrees; means for separating said modulated subcarrier wave from components of said received luminance signal whose frequencies lie outside the frequency range of the subcarrier modulation components; means for heterodyning said second derived signal with said separated wave; means for heterodyning said third derived signal with said separated wave; and means for selectively deriving in separate channels the difference frequency heterodyne components produced by said heterodyning means, respectively.

14. A receiver for a composite color television signal comprising components representative of the luminance of a televised scene and lying within a predetermined range of frequencies, a subcarrier wave which is subject to phase and amplitude modulation representative of the chrominance of the televised scene and which has a nominal frequency located near one end of said range, and color synchronizing bursts of said nominal frequency occurring during horizontal blanking intervals and having reference phase for said subcarrier wave, all of said components comprised in said composite signal being modulated on a common carrier wave, said receiver comprising: means responsive to said received composite signal to produce bursts of a signal having alternations of said nominal frequency in fixed phase relation to the alternations of said received color synchronizing bursts; means controlled in accordance with said bursts for producing a second signal of said nominal frequency and having a phase which is related to the phase of said produced bursts by substantially an integral multiple of ninety degrees; means controlled in accordance with said bursts for producing a third signal of said nominal frequency and having a phase which differs from the phase of said produced bursts by an amount substantially different from an integral multiple of ninety degrees; means for heterodyning said second produced signal with a signal derived from said modulated subcarrier wave; means for heterodyning said third produced signal with a signal derived from said modulated subcarrier wave; and means for selectively deriving in separate channels the difference frequency heterodyne components produced by said heterodyning means, respectively.

15. The system of claim 12 further comprising means for algebraically combining a fraction of the heterodyne components derived in one of said separate channels with a fraction of the heterodyne components derived in the other of said separate channels.

References Cited in the file of this patent

UNITED STATES PATENTS 2,153,178 Fitch ---------------- Apr. 4, 1939
2,717,276 Schroeder -------------- Sept. 6, 1955